United States Patent Office.

WILLIAM L. DUDLEY, OF COVINGTON, KENTUCKY, ASSIGNOR OF ONE-HALF TO JAMES P. WITHEROW, OF PITTSBURG, PENNSYLVANIA.

LINING FOR CONVERTERS AND FURNACES.

SPECIFICATION forming part of Letters Patent No. 350,920, dated October 19, 1886.

Application filed August 27, 1885. Serial No. 175,497. (No specimens.)

*To all whom it may concern:*

Be it known that I, WILLIAM L. DUDLEY, of Covington, in the county of Kenton and State of Kentucky, have invented a new and useful Improvement in Linings for Converters and Furnaces; and I do hereby declare the following to be a full, clear, and exact description thereof.

The object of my invention is the production of a neutral lining for furnaces, hearths, converters, and other vessels used for the treatment of molten iron, as distinguished from an acid or basic lining—that is, a lining which will not be attacked either by an acid or a base. In a vessel so lined the lining will not be wasted either by the silica in the iron or by basic additions—such as lime, &c.—which are charged for the purpose of removing the phosphorus or other impurities in the bath.

Another object of my invention is to obtain a lining capable of resisting high temperatures.

My improved lining is composed of chrome iron ore with fire-clay and carbonaceous matter. The ore is first calcined, if necessary, to drive off the water and any volatile substances which may be contained therein, and then pulverized, after which it is mixed with about ten per cent. of refractory fire-clay and carbonaceous matter, with sufficient water to make the mass plastic. The carbonaceous matter may be plumbago, pulverized charcoal or coke, molasses, tar, or other form, and is in the proportion to the quantity of fire-clay used of about one to four. If tar is used, no water is added. The fire clay affords a temporary binder by which the mass is enabled to be molded to shape or rammed into place in a converter or other furnace, and the carbonaceous matter is designed to effect the reduction of a sufficient amount of the ore when the heat is applied to the lining to harden the same and prevent its rapid wear by the attrition or washing of the charge, and to cement and bind it, so as to prevent its cracking or spalling with the heat. The plastic mass thus made may be molded into bricks to be used in the lining of furnaces, or the latter may be lined by ramming the plastic material into place in the bottom or hearth of the converter or furnace, after which the lining is dried and burned in the usual way.

The proportions named may be varied somewhat without departing from my invention. The amount of fire-clay used should not be much in excess of the quantity needed for the easy working of the batch, either in molding into bricks or in ramming into place, and the amount of carbonaceous matter should preferably be just sufficient to reduce enough ore to to a metallic state to harden and cement the lining. The lining thus made, being of a neutral character, will stand for a long time and effect a large saving in the trouble and expense of relining the furnace or other vessel.

I am aware that a lining composed of chrome iron ore mixed with tar, petroleum, or like substance, as described in Letters Patent No. 308,984, granted to H. D. Pochin, December 9, 1884, is not new.

What I claim as my invention, and desire to secure by Letters Patent, is—

A lining for furnaces, converters, and other vessels in which molten iron is treated, consisting of a compound of chrome iron ore and about ten per cent. of fire-clay and carbonaceous material, substantially as and for the purposes described.

In testimony whereof I have hereunto set my hand this 25th day of August, A. D. 1885.

WILLIAM L. DUDLEY.

Witnesses:
   R. H. WHITTLESEY,
   THOMAS B. KERR.